United States Patent [19]

Austin

[11] Patent Number: 4,954,071
[45] Date of Patent: Sep. 4, 1990

[54] CALIBRATING BLOW PIN

[75] Inventor: George H. Austin, Marietta, Ga.

[73] Assignee: Sewell Plastics, Inc., Atlanta, Ga.

[21] Appl. No.: 414,105

[22] Filed: Sep. 28, 1989

[51] Int. Cl.$^5$ .................. B29C 49/50; B29C 49/58
[52] U.S. Cl. .................................... 425/531; 83/914;
    425/289; 425/535; 425/806
[58] Field of Search ............... 425/531, 535, 525, 536,
    425/806, 289, 527; 264/536, 525, 526; 83/914;
    428/36.9; 215/1 C

[56] References Cited

U.S. PATENT DOCUMENTS

| | | | |
|---|---|---|---|
| 3,224,038 | 12/1965 | Budesheim | 425/531 |
| 3,278,666 | 10/1966 | Donald | 425/525 X |
| 3,303,249 | 2/1967 | Strauss | 264/533 X |
| 3,311,950 | 4/1967 | Strauss | 264/533 X |
| 3,371,376 | 3/1968 | Fischer et al. | 264/531 X |
| 3,564,652 | 2/1971 | Baugnies et al. | 425/531 X |
| 3,752,628 | 8/1973 | Hafele et al. | 425/531 |
| 3,769,394 | 10/1973 | Latrielle | 425/531 X |
| 3,782,877 | 1/1974 | Mehnert | 425/531 |
| 3,843,005 | 10/1974 | Uhlig | 215/1 C |
| 3,899,278 | 8/1975 | Fead et al. | 425/535 X |
| 3,941,541 | 3/1976 | Thiele | 425/531 X |
| 4,234,299 | 11/1980 | Kuenzig et al. | 425/535 X |
| 4,496,064 | 1/1985 | Beck et al. | 215/1 C |
| 4,497,622 | 2/1985 | Grebowiec | 425/531 X |
| 4,753,591 | 6/1988 | Maes et al. | 425/535 X |

*Primary Examiner*—Richard L. Chiesa
*Attorney, Agent, or Firm*—Barnes & Thornburg

[57] ABSTRACT

A blow mold for use with the blow pin assembly having article body, neck, and finish defining portions including an anvil portion to permit severing of a flash portion of the parison from the article. A shearing ring portion cooperates with the anvil portion to sever the flash portion of the parison from the article and both portions are inclined with respect to a plane normal to the axis of reciprocation of the blow pin to form an inclined finish on the article. A tip portion has an outer surface cooperating with the finish defining portion to calibrate the thickness of the article between the neck and anvil portions.

20 Claims, 2 Drawing Sheets

CALIBRATING BLOW PIN

Background of the Invention

The present invention relates generally to blow-molded plastic containers and particularly to a blow pin assembly and mold for blow-molding containers from an extruded parison to provide an inclined finish on the container having a uniform wall thickness.

Various methods and apparatus for blow-molding plastic containers are known including apparatus for blow-molding containers from an extruded parison. In such apparatus, a tube-like parison is extruded from an extruder head and as the parison reaches the desired or corrected length, a split or bifurcated mold closes around the parison. The parison is severed above the mold so as to create a small amount of flash, and the mold with the enclosed parison is shuttled to a blowing station. A blow pin is lowered into the open top portion of the parison as it is held in the mold. Once the blow pin is in the correct position, a blowing medium, typically air, is introduced into the parison causing the container to be formed by the parison conforming to the contours of the cavity on the inside of the mold. The two halves or bifurcated portions of the mold then separate from each other leaving the formed container. The mold then proceeds to close on another extruded tubular parison to repeat the process.

As a general rule, the extruded tubular parison has a circularly symmetric wall thickness. The thickness of the wall of the finished container at any point is inversely related to the radius of that point from the axis of the container. That is, as the parison is stretched further before coming in contact with the interior surface of the mold, the wall thickness becomes increasingly thinner. In most circumstances, such a non-uniform thickness as a function of radius is desirable. However, it is sometimes desirable to form a container at least a portion of which has a uniform thickness over a varying radius from the axis of the container. This is particularly true when forming a pouring spout on a container such as a carafe, coffee pot or the like.

It is therefore an object of the present invention to provide a mold and blow pin assembly for blow-molding containers from extruded tubular parisons which provides for a finish of substantially uniform thickness, particularly where that finish is non-symmetric about the axis of the container and where the finish is inclined with respect to a plane normal to the axis of the container.

Summary of the Invention

A mold according to the present invention has an article body defining portion and a finish defining portion including an anvil portion to permit shearing of the flash portion of the parison from the article being molded. A blow pin is mounted for reciprocation with respect to the mold along an axis and has a first portion for introduction into the parison including a blow hole to inject blowing medium therein. A shearing ring portion is provided for cooperation with the anvil portion to shear the flash portion of the parison from the article being molded. The shearing ring portion and anvil portion are inclined with respect to a plane normal to the axis of reciprocation of the blow pin to form an inclined finish on the article being molded.

Preferably, the blow pin tip includes an outer surface which cooperates with a portion of the blow mold to gauge the finish portion of the container as it is formed between the mold and blow pin assembly. The blow pin tip outer surface and mold inner surface spacing can be varied to achieve various container wall thicknesses adjacent the finish portion of the container.

The blow pin assembly includes a center shaft having a blow hole along an axis thereof to permit the injection of blowing medium. The center shaft has a first end for receiving blowing medium and a second end. The surface of the center shaft surrounding the second end is inclined with respect to the axis of the center shaft. A shearing ring is mounted in contact with the inclined surface of the center shaft second end and has an outer periphery extending radially beyond the periphery of the center shaft. A sleeve surrounding the center shaft includes an inclined end surface contacting a surface of the shearing ring adjacent the periphery thereof. Coupling means couples the sleeve to the center shaft in an adjustable manner. A blow pin tip is fixed to the shearing ring on a side opposite the center shaft and fastener means is provided for coupling the blow pin tip to the center shaft.

Preferably, an alignment holding means is fixed to the first end of the center shaft for holding the angular alignment of the center shaft so that the shearing ring and anvil cooperate to shear the parison flash from the finish of the container while engaging the container wall thickness in the immediate vicinity of the finish.

One feature of the present invention is the use of the outside surface of the blow pin tip in cooperation with a portion of the mold wall adjacent the finish defining portion to uniformly gauge the thickness of the container in this region. This ensures that the finished container will have adequate strength particularly where a segment of the finish of the container is radially displaced with respect to the remainder of the finish of the container. This feature has the advantage of permitting the finish of the container to be formed during the molding step rather than having the finish first blown and then later cut and polished as was the practice in the prior art. Additional features and advantages of the invention will become apparent to those skilled in the art upon consideration of the following detailed description of a preferred embodiment exemplifying the best mode of carrying out the invention as presently perceived. The detailed description particularly refers to the accompanying drawings.

Description of the Preferred Embodiment

Figure 1:
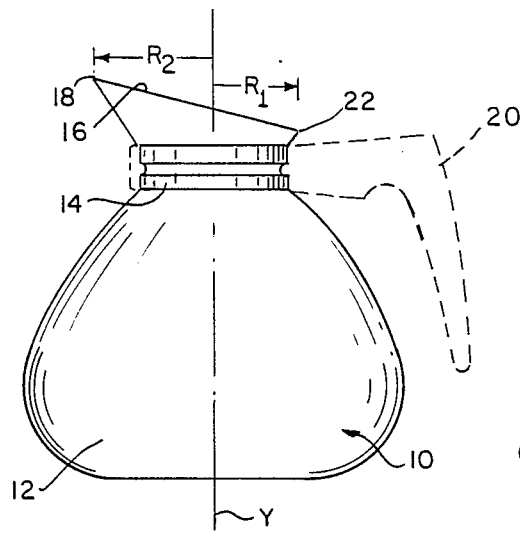
FIG. 1 is a side elevation view of a sample container which can be made using an apparatus in accordance with the present invention.

The present invention is particularly suited to the manufacture of containers such as coffee pot 10 shown in FIG. 1. The container 10 is shown to have a body portion 12, a neck portion 14 and an inclined finish portion 16 forming a pouring spout 18. While a handle 20 is shown in phantom, it will be appreciated that the handle is formed separately and added by a mechanical attachment to the container 10. While the container 10 illustrated in FIG. 1 is an example of containers which can be constructed in accordance with the present invention, the example is not intended to be limiting of the invention in any way. It is to be noted that while the body portion 12 and neck portion 14 are generally symmetric about axis Y, a lower most portion 22 of the finish is considerably closer to the axis Y than is the upper most portion 18. That is, radius $R_1$ is smaller than radius $R_2$.

If the portion of the container 10 above the neck 14 is formed by blow-molding as is conventional in the prior art, the thickness of the container at this pouring spout 18 will be appreciably thinner than at portion 22, yet it is at this pouring spout 18 where strength is required. An increase in thickness, and hence increased strength, is achievable by using a blowing mold and blow pin assembly in accordance with the present invention.

Figure 2:
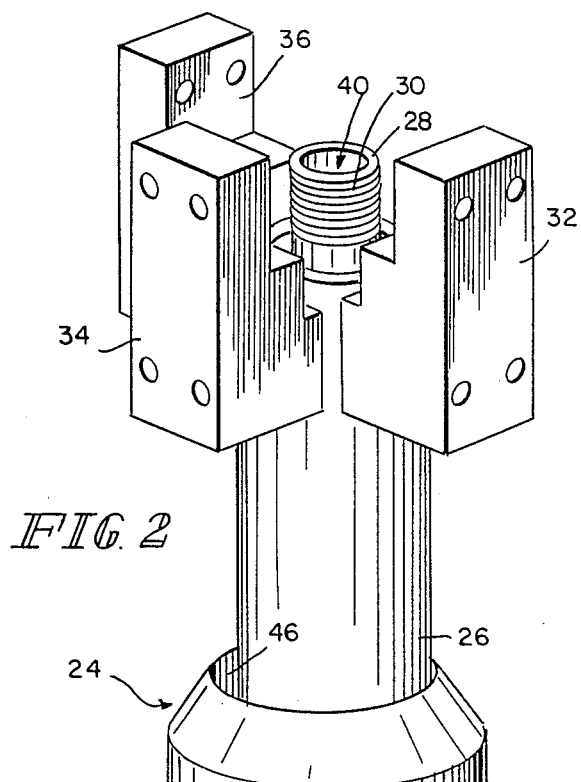
FIG. 2 is a perspective view of a blow pin assembly in accordance with the present invention.

FIG. 2 shows a blow pin assembly 24 in accordance with the present invention. The blow pin assembly 24 includes a center shaft 26. The center shaft 26 has a first end 28 for receiving blowing medium such as compressed air from a source, not illustrated. The first end 28 includes threads 30 to permit coupling to a conduit of the blowing medium, not shown, to the center shaft 26. A plurality of alignment blocks 32, 34 and 36 are provided which are fixed to the center shaft 26 and are adapted to be mounted to an appropriate blow-molding apparatus, not shown, for reciprocation with respect to a blowing mold.

Figure 3:
FIG. 3 is a top plan view of the blow pin assembly shown in FIG. 2.

As best noted in FIG. 3, the alignment holding blocks 32, 34, 36 engage three lands 38 situated around the circumference of center shaft 26. A hole 40 extends longitudinally through the center of the center shaft to introduce blowing medium from the first end 28 to the inside of the blow mold.

A sleeve 42 surrounds the center shaft 26 and is situated in a non-coaxial arrangement by means of the adjustable locking means such as screws 44. The inside surface 46 of sleeve 42 is generally spaced from the center shaft by a distance d shown in FIG. 3 which varies around the circumference of the center shaft 26.

Figure 4:
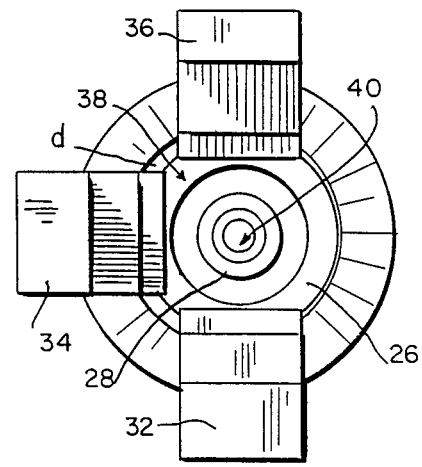
FIG. 4 is a bottom plan view of the blow pin assembly shown in FIG. 2.
Figure 4:
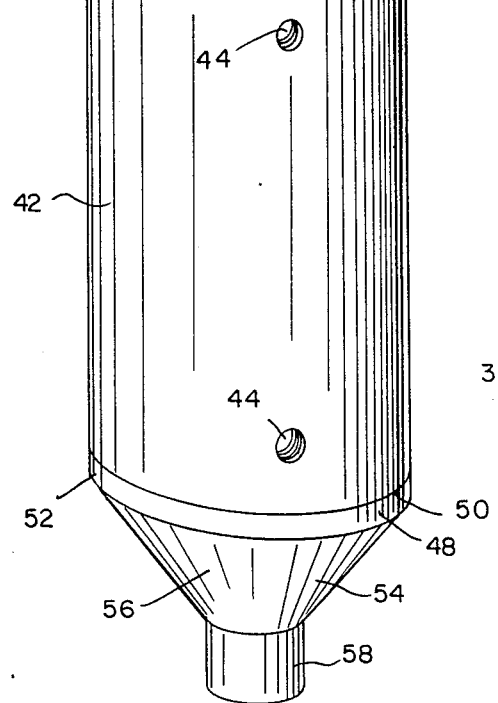
Figure 4:
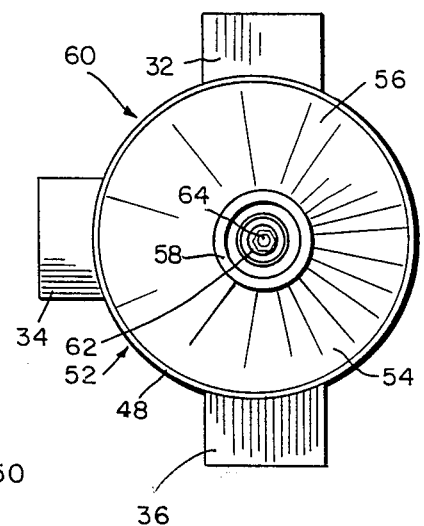

A shearing ring 48 is positioned in contact with a lower inclined surface 50 of the sleeve 42. The shearing ring 48 includes an outer periphery 52 having substantially the same diameter as sleeve 42. A blow pin tip 54 is fixed to the shearing ring 48 and includes a tapering surface 56 which tapers from a diameter slightly smaller than periphery 52 of shearing ring 48 down to a cylindrical nose section 58. As shown in FIG. 4, the outer periphery 60 of the conical surface 56 of blow pin tip 54 is symmetric with outer periphery 52 of shearing ring 48. It will be appreciated that non-symmetric allignment is achievable in the appropriate circumstance.

Within the cylindrical nose section 58 is a fastening means 62 which includes a central opening 64 leading to opening 40 of the center shaft 26. These features are more clearly illustrated in FIG. 5 which shows the lower end of center shaft 26 and sleeve 42 as well as the shearing ring 48 and blow pin tip 54. It is to be noted in FIG. 5 that the shearing ring 48 is fixed to the blow pin tip 54 by pin means 63 press fit through an opening in the shearing ring 48 into a blind hole in the blow pin tip 54. The blow pin tip 54 and shearing ring 48 are then secured to the lower end of the center shaft 26 by means of fastener 62 engaging threads 66 on the interior surface of central opening 40.

The entire blow pin assembly 24 is vertically reciprocable with respect to split mold 68 which includes a left mold half 70 and right mold half 72 joined along split line 74 to form a cavity 76 in which container 10 can be formed. Vacuum ring blocks 78 and 80 are secured to mold halves 70 and 72 and hold striker plates 82 and 84 in fixed position with respect to the mold 68. The striker plates 82 and 84, which are typically made of hardened steel, as is cutter ring 48, are supported from an underneath surface by striker plate supports 86 and 88. An inner edge 90 of the striker plates 82. 84 cooperates with the outer periphery 52 of cutter ring 48 to remove the flash 92 from the finish 16 of the molded article 10. It is to be noted that the inner surface 94 of an upper portion of the mold is spaced at a small distance from, but parallel to, surface 56 of the blow pin tip 54 so as to gauge the portion of the container between the finish 16 and the neck defining region 14 thereby ensuring a uniform thickness around the lip of the container.

Figure 6:
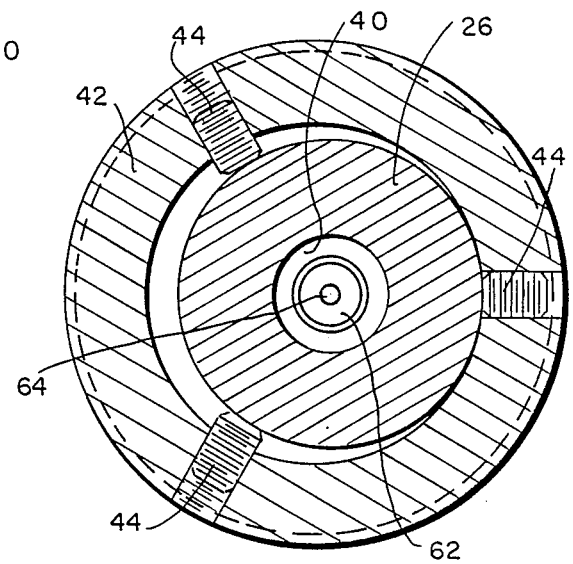
FIG. 6 is a sectional view taken along line 6—6 of FIG. 5.

The asymmetric relationship between the center shaft 26 and the support sleeve 42 shown in FIG. 3 is even more clearly revealed in FIG. 6 which also shows the inner end of fastening means 62 and the central opening 64 through the fastening means 62.

Figure 5:
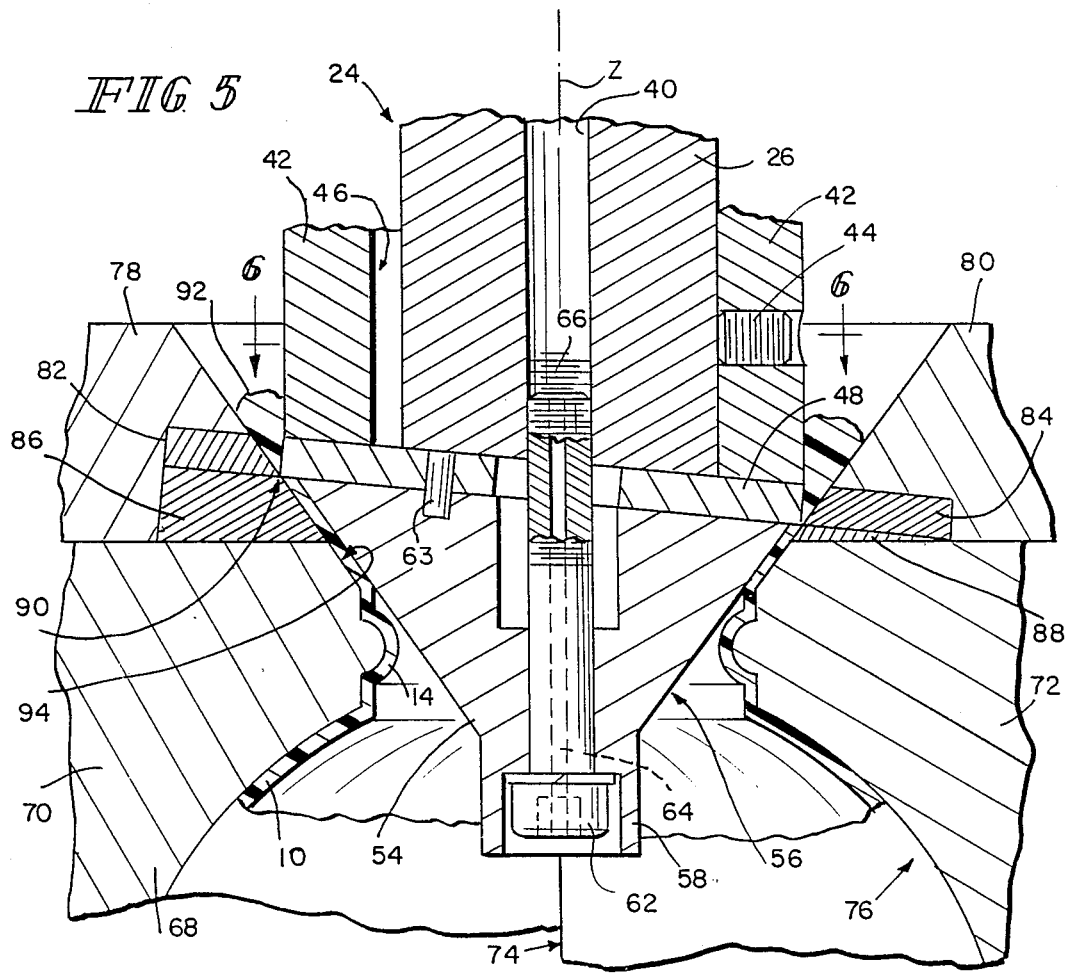
FIG. 5 is a sectional detail view of the blow pin assembly cooperating with the mold to form a container in accordance with the present invention.

While the cutter plate 48 is shown in FIG. 4 to be generally circular and in FIG. 5 to have parallel upper and lower surfaces inclined with respect to a plane normal to the axis C of the center shaft 26, it will be appreciated that the shearing ring may have other thicknesses and other peripheral shapes suitable to define the upper finish 60 of the container having a different appearance from that shown in FIG. 1. That is, although the invention has been described in detail with reference to the illustrated preferred embodiment and the illustrated specific example of FIG. 1, variations and modifications exist within the scope and spirit of the invention as described and as defined in the following claims.

What is claimed is:

1. A blow pin and blowing mold for use in blow-molding articles from an extruded parison comprising:
   a mold having an article body defining portion and a finish defining portion including an anvil portion to permit severing of a flash portion of the parison from the article being molded, and
   a blow pin, mounted for reciprocation with respect to the mold along an axis, having a first portion for introduction into the parison including a blow hole to inject blowing medium therein and a shearing ring portion for cooperation with the anvil portion to sever the flash portion of the parison from the article being molded,
   the shearing ring portion and anvil portion both being inclined with respect to a plane normal to the axis of reciprocation of the blow pin to form an inclined finish on the article being molded.

2. The apparatus of claim 1 further comprising alignment maintaining means for maintaining the shearing ring in alignment with respect to the mold.

3. The apparatus of claim 2 wherein the alignment maintaining means comprises a blow pin tip secured to the blow pin and means fixing the shearing ring to the blow pin tip.

4. The apparatus of claim 2 wherein the alignment maintaining means comprises a sleeve surrounding the blow pin including an inclined lower surface contacting a surface of the shearing ring adjacent the periphery thereof.

5. The apparatus of claim 2 wherein the alignment maintaining means comprises a plurality of alignment holding block fixed to the blow pin at an end opposite from the shearing ring.

6. The apparatus of claim 1 wherein the mold includes a neck-defining portion between the body defining portion and the finish defining portion.

7. The apparatus of claim 6 wherein the mold further includes an upwardly and outwardly tapered portion between the neck-defining portion and the finish defining portion.

8. A blow pin assembly for use in injecting blowing medium into an extruded parison comprising:
   a center shaft including a blow hole along an axis thereof to permit the injection of blowing medium therethrough having a first end for receiving blowing medium and a second end, the surface of the center shaft surrounding the second end being inclined with respect to said axis;
   a shearing ring mounted in contact with the center shaft inclined surface having an outer periphery extending radially beyond the periphery of the center shaft to form an inclined finish on an article to be created by the blowing medium;
   a sleeve surrounding the center shaft including an inclined end surface contacting a surface of the shearing ring adjacent the periphery thereof, and coupling means for coupling the sleeve to the center shaft; and
   a blow pin tip fixed to the shearing ring on a side opposite the center shaft and fastener means coupling the blow pin tip to the center shaft.

9. The blow pin assembly of claim 8 further comprising alignment holding means fixed to the first end of the center shaft for holding the angular alignment of the center shaft.

10. The blow pin assembly of claim 8 wherein the center shaft first end further comprises a coupling means for coupling to a source of blowing medium.

11. The blow pin assembly of claim 8 wherein the shearing ring outer periphery is non-coaxial and inclined with respect to said axis of the center shaft.

12. The blow pin assembly of claim 8 wherein the shearing ring includes parallel upper and lower surfaces.

13. The blow pin assembly of claim 8 wherein the sleeve outer periphery is non-coaxial with respect to said axis of the center shaft.

14. The blow pin assembly of claim 8 wherein the blow pin tip includes a tapered outer surface for gauging a finish portion of an article formed with the blow pin assembly.

15. The blow pin assembly of claim 8 wherein the fastener means coupling the blow pin tip to the center shaft includes a hole along an axis thereof, the fastener means being received in the blow hole second end.

16. A blow pin and blowing mold for use in blow-molding articles from an extruded parison comprising:
   a mold having an article body defining portion, a neck defining portion, and a finish defining portion including an anvil portion to permit severing of a flash portion of the parison from the article being molded, and
   a blow pin, mounted for reciprocation with respect to the mold along an axis, having a tip portion for introduction into the parison including a blow hole to inject blowing medium therein and a shearing ring portion for cooperation with the anvil portion to sever the flash portion of the parison from the article being molded,
   the shearing ring portion and anvil portion both being inclined with respect to a plane normal to the axis of reciprocation of the blow pin to form an inclined finish on the article being molded,
   the tip portion having an outer surface cooperating with the finish defining portion to calibrate the thickness of the article between the neck defining portion and the anvil portion.

17. The apparatus of claim 16 further comprising alignment maintaining means for maintaining the shearing ring in alignment with respect to the mold comprising means fixing the shearing ring to the blow pin tip and a sleeve surrounding the blow pin including an inclined lower surface contacting a surface of the shearing ring adjacent the periphery thereof.

18. The apparatus of claim 17 further comprising fastener means coupling the blow pin tip to the blow pin including a hole along an axis thereof, the fastener means being received in the blow hole.

19. The apparatus of claim 17 wherein the outer surface of the tip portion is conical about said blow pin axis.

20. The apparatus of claim 17 wherein the outer surface of the tip portion is parallel to the mold between the finish defining portion and the neck defining portion.

* * * * *